United States Patent
Isono et al.

(10) Patent No.: US 6,216,171 B1
(45) Date of Patent: *Apr. 10, 2001

(54) CABLE MODEM CONTROL METHOD GIVING PRIORITY TO PACKETS FROM THE CABLE HEAD END OVER PACKETS FROM THE SUBSCRIBER LAN

(75) Inventors: Hiroaki Isono; Toshimichi Nishimura, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,828

(22) Filed: Feb. 11, 1998

(30) Foreign Application Priority Data

Feb. 13, 1997 (JP) .................................................. 9-028690

(51) Int. Cl.[7] ........................... G06F 15/16; H04L 12/66; H04B 1/38
(52) U.S. Cl. ............................ 709/250; 370/463; 375/222
(58) Field of Search ........................... 348/6, 12; 455/4.2, 455/5.1; 709/203, 207, 250; 710/40; 370/463; 375/222, 257

(56) References Cited

U.S. PATENT DOCUMENTS

| | | | |
|---|---|---|---|
| 4,475,123 | * 10/1984 | Dumbauld et al. | 380/13 |
| 4,930,123 | * 5/1990 | Shimizu | 370/389 |
| 5,210,748 | * 5/1993 | Onishi et al. | 370/405 |
| 5,535,338 | * 7/1996 | Krause et al. | 709/222 |
| 5,560,038 | * 9/1996 | Haddock | 709/236 |
| 5,615,340 | * 3/1997 | Dai et al. | 709/250 |
| 5,677,910 | * 10/1997 | Delaney | 370/402 |
| 5,720,032 | * 2/1998 | Picazo, Jr. et al. | 709/250 |
| 5,790,806 | * 8/1998 | Koperda | 709/252 |
| 5,805,806 | * 9/1998 | McArthur | 709/250 |
| 5,896,512 | * 4/1999 | Einbinder et al. | 709/250 |
| 5,912,896 | * 6/1999 | Beighe et al. | 370/463 |
| 5,926,626 | * 7/1999 | Takeuchi et al. | 709/249 |
| 5,943,604 | * 8/1999 | Chen et al. | 455/5.1 |
| 5,970,066 | * 10/1999 | Lowry et al. | 370/353 |
| 6,047,325 | * 4/2000 | Jain et al. | 709/227 |

* cited by examiner

*Primary Examiner*—Zarni Maung
*Assistant Examiner*—Andrew Caldwell
(74) *Attorney, Agent, or Firm*—Jay H. Maioli (57) ABSTRACT

An information-supply control apparatus and method uses a cable modem. The cable modem has one I/O connector attached to a coaxial cable coupling the cable modem with the cable system's head end. Another I/O connector is attached to a subscriber's local area network (LAN). The cable modem prioritizes its processing of packets as follows. Packets received from the cable system head end that are addressed to devices on the subscriber LAN are given the highest priority. Packets received from the cable system head end that are addressed to the cable modem itself are given the second highest priority. Packets received from the subscriber LAN that are to be transferred to the coaxial cable are given the third highest priority. Finally, packets that are received from the subscriber LAN that are to be transferred back to the subscriber LAN are given the fourth highest priority. The cable modem also determines whether a received packet has overflowed its allocated buffer. Upon detecting buffer overflow, the cable modem discards the overflow data.

4 Claims, 9 Drawing Sheets

Based on the Broadcom 3118, ANNEX A and MPEG FRAME.
The SYNC pattern is 47H.

Ethernet Header

CABLE MODEM CONTROL METHOD GIVING PRIORITY TO PACKETS FROM THE CABLE HEAD END OVER PACKETS FROM THE SUBSCRIBER LAN

BACKGROUND OF THE INVENTION

1. Field of the Invention

The present invention relates to information-supply control apparatuses and methods, and in particular, to an information-supply control apparatus and method which enables efficient information supply by providing information with priority.

2. Description of the Related Art

A cable television (CATV) system distributes video signals from one head end (broadcasting station) to subscribers' television receivers via optical fiber cables and so forth. Since the CATV system has a relatively large cable transmission capacity, it is proposed that the CATV system should provide service for connecting to the Internet. In this case, a cable modem as a cable-line end is connected to the CATV system, and a plurality of personal computers and the like are connected to this cable modem via a local area network (LAN) using an Ethernet etc. In addition, each personal computer is connected to the head end via the LAN, and the head end establishes connection to the Internet.

In this manner, when information is received from or transmitted to the Internet with the CATV system, the information is entangled, and in the worst case, there is a possibility in which each subscriber cannot receive video signals, distributed in real time on the Internet, in the form of a moving picture. In addition, when such a situation arises, there is a problem in which restoring to the normal condition takes time.

SUMMARY OF THE INVENTION

In view of the foregoing circumstances there has been made the present invention, and an object thereof is to provide an information-supply control apparatus and method capable of efficiently supplying information.

To this end, according to an aspect of the present invention, the foregoing object has been achieved through provision of an information-supply control apparatus for controlling the supply of information supplied from a first apparatus and a plurality of second apparatuses, the information-supply control apparatus connected to the first apparatus via a cable and to the plurality of second apparatuses via a network, in which the information-supply control apparatus includes: determination means for determining whether received information is either first information to be supplied from the first apparatus to the plurality of second apparatuses or another second information; priority providing means for providing the first information with priority over the second information; and processing means for processing the information in accordance with the priority provided.

According to another aspect of the present invention, the foregoing object has been achieved through provision of an information-supply control apparatus for controlling the supply of information output from a first apparatus and a plurality of second apparatuses, the information-supply control apparatus connected to the first apparatus via a cable and to the plurality of second apparatuses via a network, in which the information-supply control apparatus includes: determination means for determining whether received information is either first information supplied from the first apparatus or second information supplied from the plurality of second apparatuses; priority providing means for providing the first information with priority over the second information; and processing means for processing the information in accordance with the priority provided.

According to a further aspect of the present invention, the foregoing object has been achieved through provision of a control method for an information-supply control apparatus which controls the supply of information supplied from a first apparatus and a plurality of second apparatuses, the information-supply control apparatus connected to the first apparatus via a cable and to the plurality of second information-supply control apparatuses via a network, in which the control method includes: a determination step for determining whether received information is either first information to be supplied from the first apparatus to the plurality of second apparatuses or another second information; a priority providing step for providing the first information with priority over the second information; and a processing step for processing the information in accordance with the priority provided.

According to a still further aspect of the present invention, the foregoing object has been achieved through provision of a control method for an information-supply control apparatus which controls the supply of information supplied from a first apparatus and a plurality of second apparatuses, the information-supply control apparatus connected to the first apparatus via a cable and to the plurality of second information-supply control apparatuses via a network, in which the control method includes: a determination step for determining whether received information is either first information supplied from the first apparatus or second information supplied from the plurality of second apparatuses; a priority providing step for providing the first information with priority over the second information; and a processing step for processing the information in accordance with the priority provided.

As described above, according to an information-supply control apparatus and method of the present invention, first information supplied from a first apparatus to a plurality of second apparatuses is provided with priority over another second information when it is processed, which thus realizes efficient information supply.

In addition, according to an information-supply control apparatus and method of the present invention, first information supplied from a first apparatus is provided with priority over second information supplied from a plurality of second apparatuses when it is processed, which thus realizes efficient information supply.

DESCRIPTION OF THE PREFERRED EMBODIMENT

Figure 1:
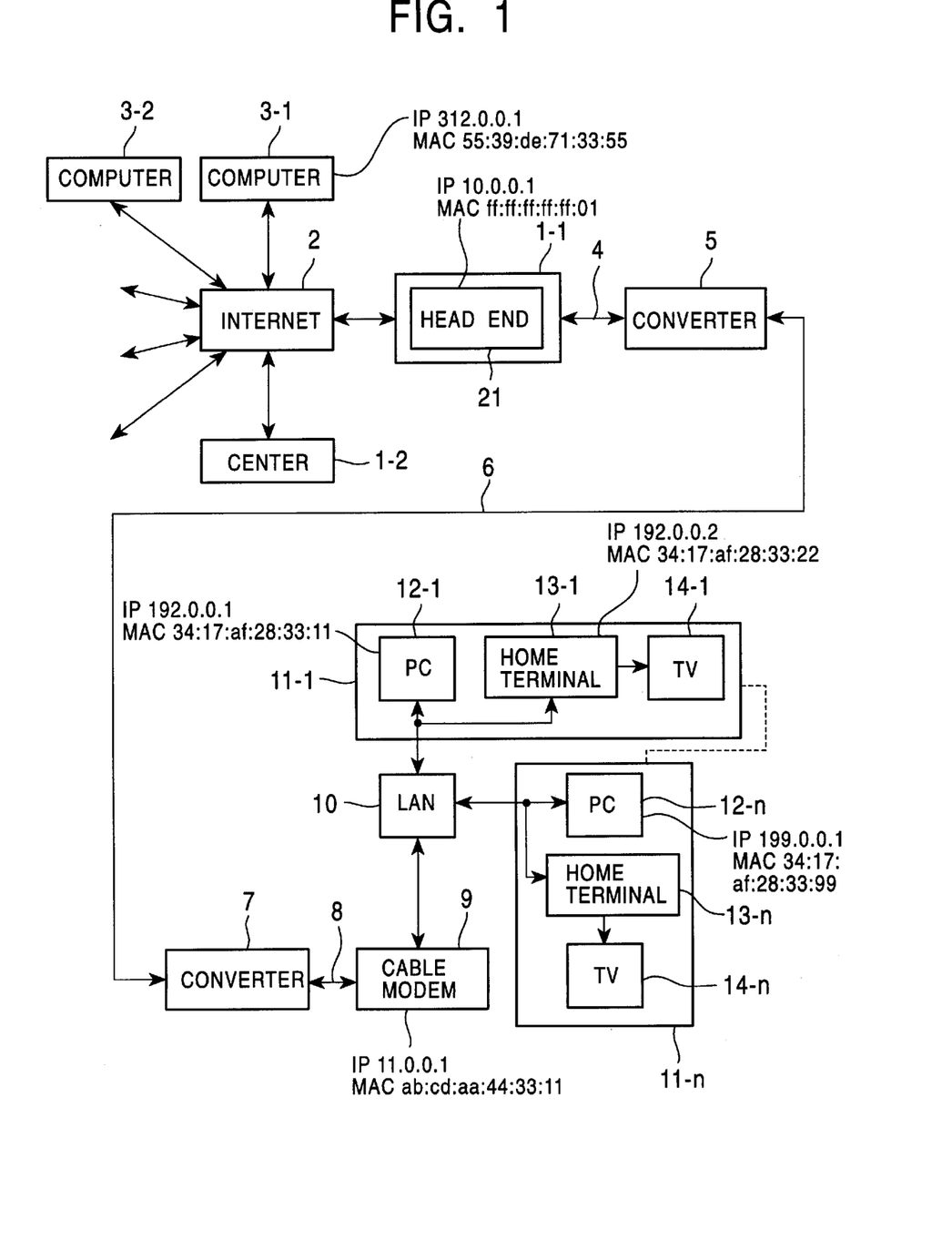
FIG. 1 is a block diagram showing an example of the structure of a CATV system to which an information-supply control apparatus of the present invention is applied.

FIG. 1 shows an example of a CATV system to which an information-supply control apparatus of the present invention is applied. A center 1-1 as a broadcasting station (video provider) provides broadcast video information, and includes a head end 21 for transmitting or receiving the information. A converter 5 is connected to the center 1-1 via a coaxial cable 4. The converter 5 converts an electrical signal input via the coaxial cable 4 to an optical signal before outputting it to an optical fiber cable 6, and converts an optical signal input from the optical fiber 6 to an electrical signal before outputting it to the coaxial cable 4. In the same manner, a converter 7 converts the optical signal input from the optical fiber cable 6 to an electrical signal before outputting it to a coaxial cable 8, and converts an electrical signal input from the coaxial cable 8 to an electrical signal before outputting it to the optical fiber cable 6.

In other words, in this system, which employs a hybrid fiber coaxial (HFC) system, information is transmitted up to the vicinity of a cable modem 9 (for example, within a range of several hundred meters) by the optical fiber cable 6, and is further transmitted by the coaxial cable 8.

The cable modem 9 is connected to a LAN 10 using the Ethernet etc. Terminals 11-1 to 11-n are connected to the LAN 10, and the terminals 11-1 to 11-n respectively include personal computers (PCs) 12-1 to 12-n, home terminals 13-1 to 13-n, and television receivers (TVs) 14-1 to 14-n.

In addition, the Internet 2 is connected to the center 1-1, and not only another center 1-2 but also computers 3-1, 3-2, etc. are connected to the Internet 2.

Figure 2:
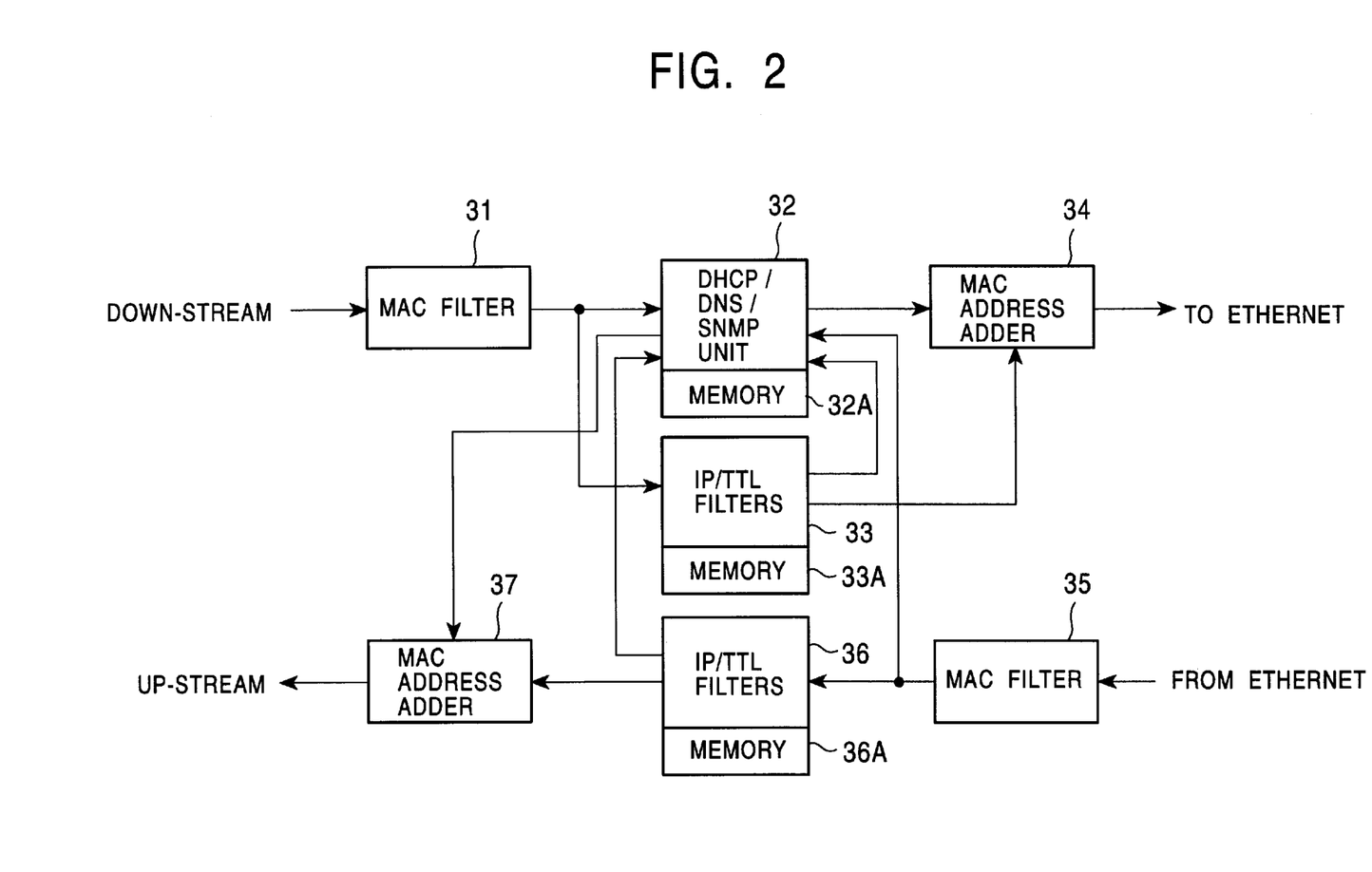
FIG. 2 is a block diagram showing the structure of one cable modem shown in FIG. 1.

FIG. 2 shows a block diagram of the cable modem 9. When (downstream) data from the center 1-1, supplied from the converter 7 via the coaxial cable 8, is input, a media access control (MAC) filter 31 extracts from this data only data having a destination address (MAC address) designating itself, and outputs the extracted data to dynamic-host configuration-protocol/domain-naming-system/simple-network management-protocol (DHCP/DNS/SNMP) units 32 and Internet-protocol-filter/time-to-live (IP/TTL) filters 33. The MAC filter 31 (and a MAC filter 35 also) has an address resolution protocol (ARP), and presets the MAC addresses of the adjacently connected devices (head end 21, terminals 111 to 11-n) and itself when it is activated.

The DHCP/DNS/SNMP units 32 execute the process of dynamically assigning IP addresses in their DHCP unit, and also substitute IP addresses for domain names so that the DNS unit can uniquely identify one computer registered in the Internet 2 using its name.

The head end 21 is provided with the function of executing a process substantially identical to the process by the DHCP and DNS units. The IP addresses are assigned to the terminals 11-1 to 11-n by the head end 21. The DHCP and DNS units of the cable modem 9 function supplementarily when the connection between the cable modem 9 and the head end 21 is broken for a certain reason.

The SNMP unit of the cable modem 9 executes a process for managing and monitoring nodes in the network. Specifically, for example, it executes a process for responding to an inquiry on its condition from the head end.

The IP filter of the IP/TTL filters 33 extracts only data having the destination IP addresses assigned to the terminals 11-1 to 11-n connected to the LAN 10 (Ethernet) from the data supplied from the MAC filter 31. The TTL filter of the IP/TTL filters 33 determines whether or not the input data packet has time (TTL value of 2 or greater) to enable its existence on the Internet 2, and extracts only data which can exist longer before decrementing the TTL value by 1 and outputting the data. The data extracted by the IP/TTL filters 33 is supplied to the DHCP/DNS/SNMP units 32 and a MAC address adder 34. The MAC address adder 34 adds a MAC address to the data supplied from the DHCP/DNS/SNMP units 32 or the IP/TTL filters 33 before outputting the result to the LAN 10.

A MAC filter 35 extracts only data having a destination address (MAC address) designating the cable modem 9, and supplies the extracted data to the DHCP/DNS/SNMP units 32 and the IP/TTL filters 36. The IP/TTL filters 36 have the source IP addresses of the terminals 11-1 to 11-n to manage, and extract only the data of a packet which can exit longer on the Internet before outputting the extracted data to a MAC address adder 37 and the DHCP/DNS/SNMP units 32. The MAC address adder 37 adds a MAC address to the data supplied from the IP/TTL filters 36 or the DHCP/DNS/SNMP units 32, and outputs the result as upstream data to the coaxial cable 8.

The DHCP/DNS/SNMP units 32, the IP/TTL filters 33 and the IP/TTL filters 36 include buffer memories 32A, 33A and 36A, respectively.

Figure 3:
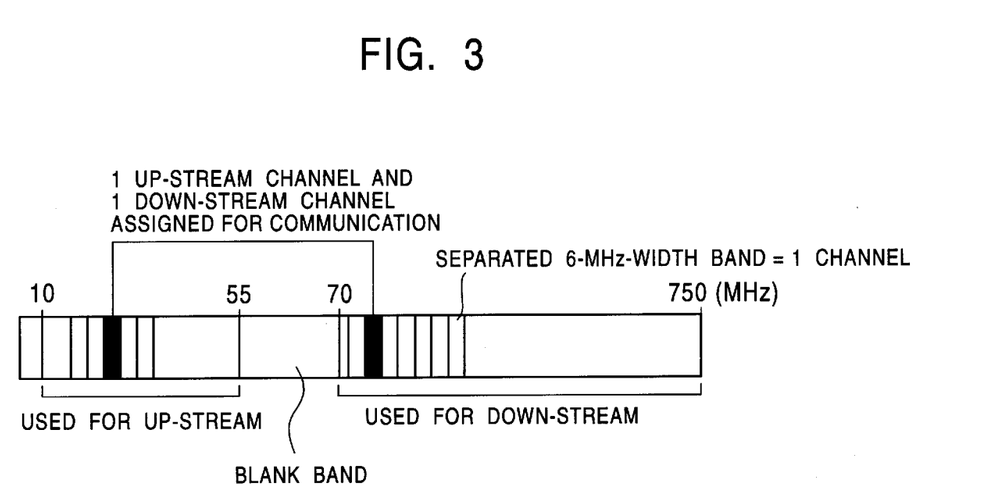
FIG. 3 is a chart showing the spectrum of a transmission signal on the optical fiber cable shown in FIG. 1.

FIG. 3 shows the spectrum of a signal between the head end 21 of the center 1-1 and the terminals 11-1 to 11-n. As shown in FIG. 3, a frequency band of 10 MHz to 55 MHz is used for upstream transmission, namely, transmission from the terminals 11-1 to 11-n to the center 1-1, and a frequency band of 70 MHz to 750 MHz is used for downstream transfer, namely, data transfer from the center 1-1 to the terminals 11-1 to 11-n. The frequency band for the downstream transfer is set wider than the frequency band for the upstream transmission. This is because the transmission of video data from the center 1-1 to the terminals 11-1 to 11-n requires a wide band, while what are upstream transmitted mainly include commands, for which a narrow band is sufficient. In the frequency band for the downstream transfer, a width of 6 MHz is assigned to one channel. Since the cable modem 9 needs n channels, n channels are assigned to each of the upstream and downstream transmission bands. The n channels (hereinafter referred to as "modem channels assigned to the cable modem 9" if necessary) are said to be channels in a frequency band different from that of channels (hereinafter referred to as "broadcast channels" if necessary) used for television broadcasting between the head end 21 and the home terminal 13.

Figure 4:
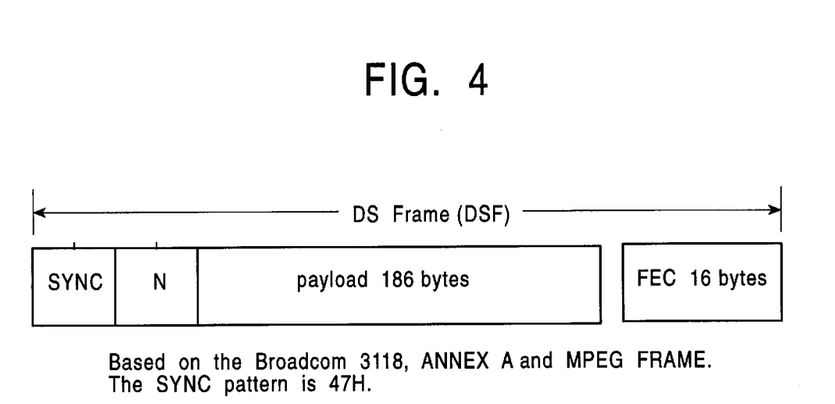
FIG. 4 is a chart illustrating a down-stream frame format in the CATV system shown in FIG. 1.

FIG. 4 shows the frame format of a downstream modem channel. As shown in FIG. 4, a synchronization signal (SYNC) having a value of 47H is set at the start of one downstream frame. In the next portion is set a value of N representing the presence or absence of the subsequent frame. This value N is 187 when the subsequent frame is present, and when the subsequent frame does not exist (in the case of the last frame), the number of the bytes of the subsequent payload is described. Specifically, next to the value N, a 186-byte payload is set. If, for example, 50-byte data is recorded in the payload, then N=50. Next to the payload, 16-byte forward error correction (FEC) for error detection is set. A receiving end uses the FEC to execute an error-detection correction process.

Figure 5:
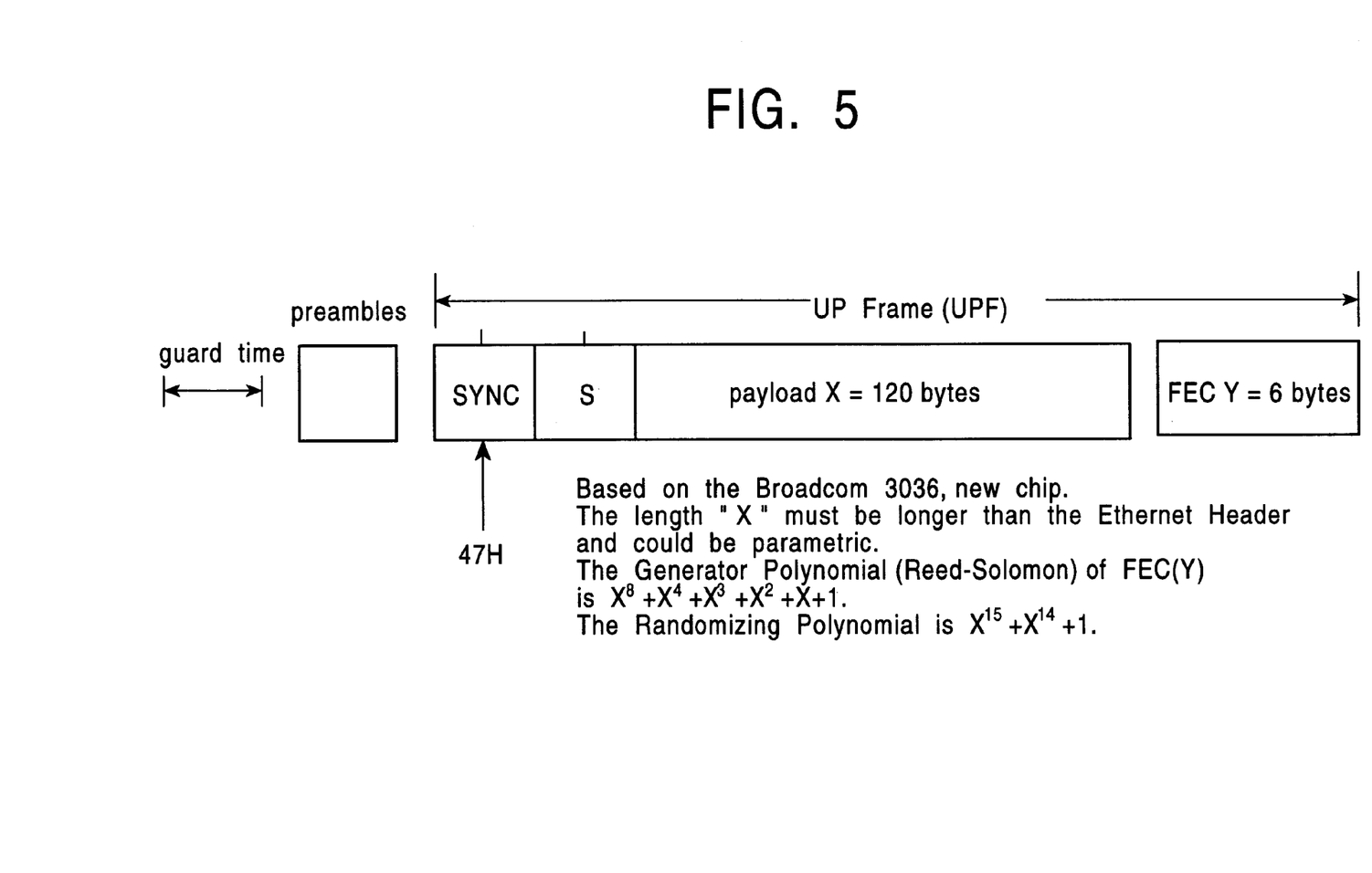
FIG. 5 is a chart illustrating an upstream frame format in the CATV system shown in FIG. 1.

FIG. 5 shows the frame format of an upstream modem channel. As shown in FIG. 5, before the upstream frame there are set a guard time for absorbing jitter and a preamble for generating a clock. Next to the preamble, a 1-byte synchronization signal having a value of 47H is set. Next to the synchronization signal, value S is set. In addition, next to the value S, a 120-byte payload is set. The value S is such that S=121 when this frame is not the last frame, similar to the value N in FIG. 4, and when this frame is the last frame, a value equal to the number of the bytes of the payload is set. Next to the payload, a 6-byte FEC is set.

Figure 6:
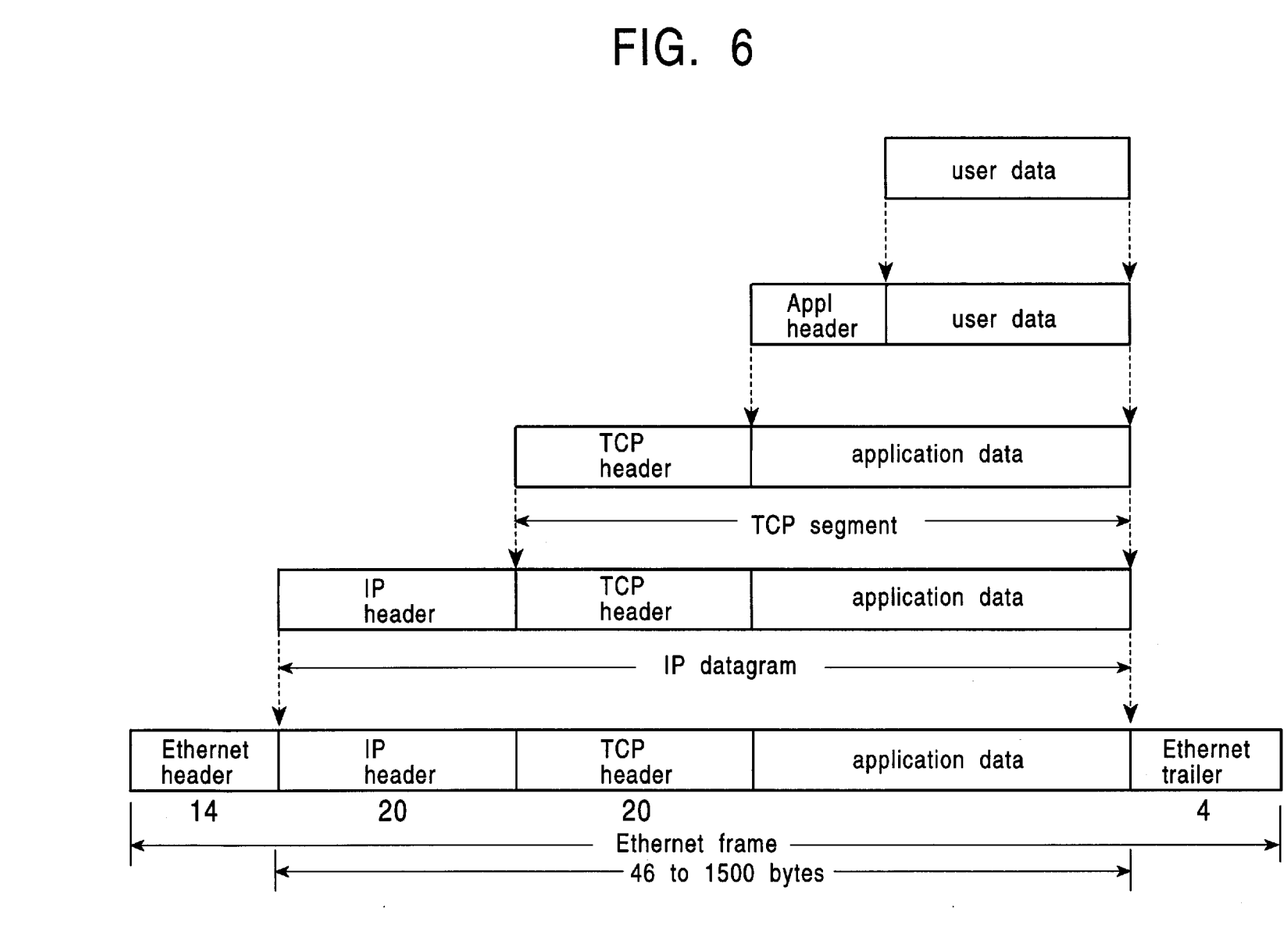
FIG. 6 is a chart illustrating the relationship between an Ethernet frame and an IP datagram.

FIG. 6 shows relationships among the frame structures of modem channels of the cable modem 9 and the Ethernet. As shown in FIG. 6, in the cable modem 9, the unit of data is the IP datagram. At the start of the IP datagram is set an IP header, and a transmission control protocol (TCP) header and an application data are subsequently set. The TCP header and the application data compose a TCP segment. The application data consists of an application header and user data.

The IP header is 20 bytes in length, and the TCP header is 20 bytes in length. The sum (IP datagram) of these and the application data is 46 to 1500 bytes in length.

A 14-byte Ethernet header is added before the IP header of the IP datagram, and a 4-byte Ethernet trailer is added next to the application data to form an Ethernet frame.

Figure 7:
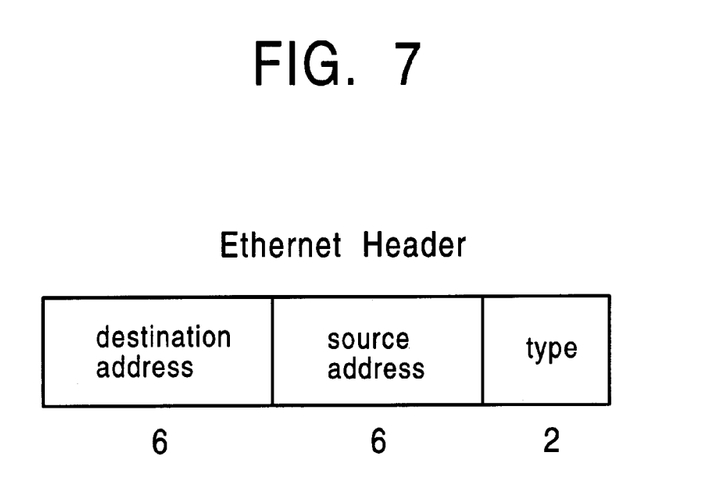
FIG. 7 is a chart illustrating an Ethernet header.

The Ethernet header consists of a 6-byte destination address, a 6-byte source address, and a 2-byte type, as shown in FIG. 7. The destination address represents the address to which data is transmitted, and the source address represents the address from which data is transmitted. The type represents the type of data.

Figure 8:
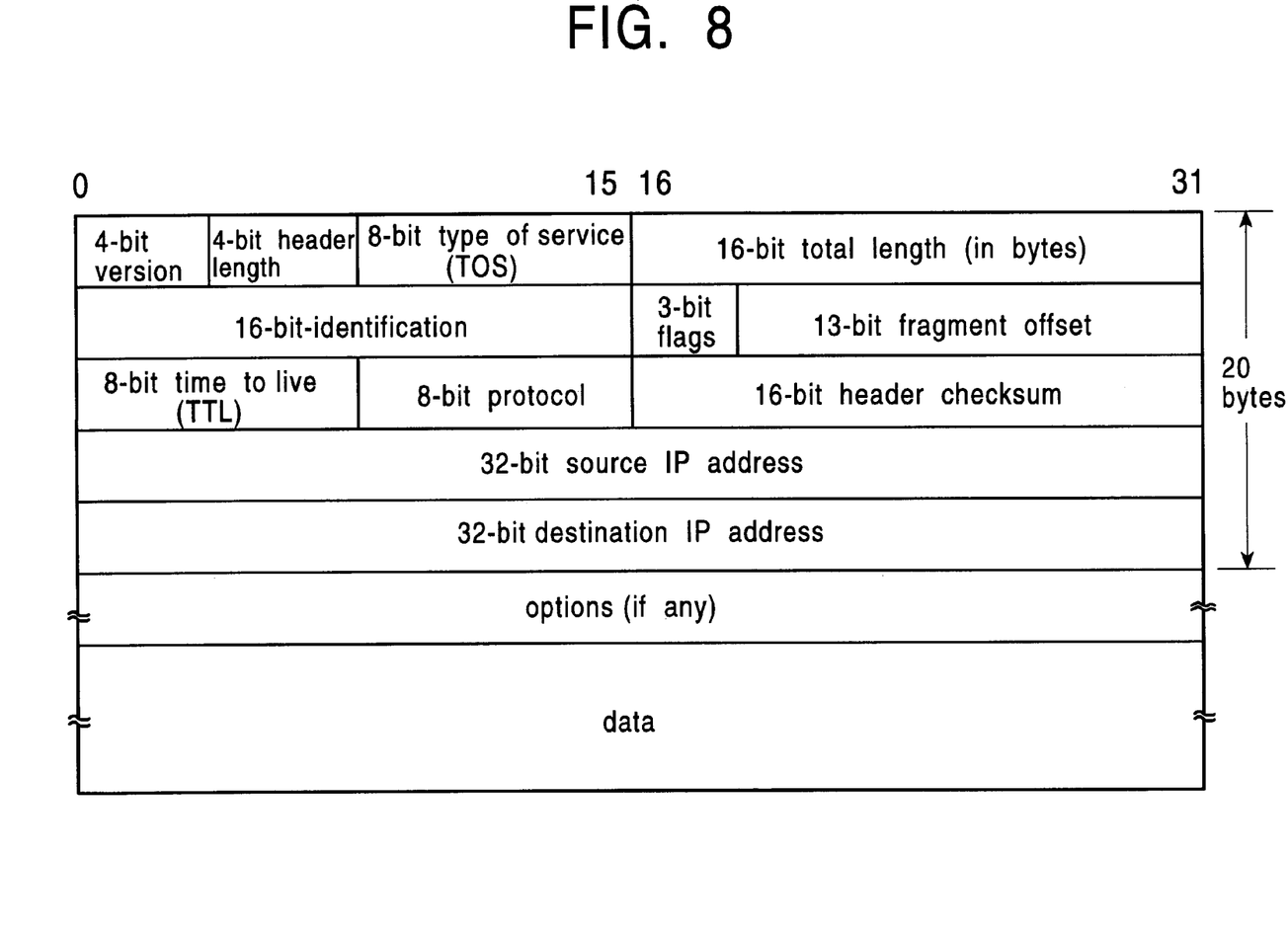
FIG. 8 is a chart illustrating an IP header.

FIG. 8 shows the structure of the IP header. At its start is set a 4-bit version, and a 4-bit header length and an 8-bit type of service (TOS) are subsequently set.

Subsequently, a 16-bit total length and a 16-bit identification (ID) are set.

Next to the ID, a 3-bit flag and a 13-bit fragment offset are set. Subsequently, an 8-bit TTL and an 8-bit protocol are set. Next to the protocol, a 16-bit header checksum, a 32-bit source IP address, and a 32-bit destination IP address are set.

The basic operation of the cable modem 9 will be described below, assuming that the MAC address and the IP address as shown in FIG. 1 are assigned to each apparatus.

For example, when the receiving of television broadcast signals on a predetermined channel is commanded by operating the home terminal 13-1 in the terminal 11-1, the home terminal 13-1 receives the designated channel signals among broadcast channel signals input from the head end 21 via the converter 5, the converter 7, the cable modem 9 and the LAN 10, and it outputs the signal to the television receiver 14-1 for display. In this manner, the broadcast program corresponding to the command can be watched and listened to. The process of this case is similar to that of the conventional CATV system.

Next, modem channel data processing will be described.

For example, when the personal computer 12-1 in the terminal 11-1 commands access to a home page on the computer 3-1, the IP address of the computer 3-1 is designated as the destination IP address shown in FIG. 8, and the IP address of the personal computer 12-1 is designated as the source IP address. In addition, the MAC address ab:cd:aa:44:33:11 of the cable modem 9 is designated as the destination address of the Ethernet shown in FIG. 7, and the MAC address 34:17:af:28:33:11 of the personal computer 12-1 is designated as the source address.

Since the MAC filter 35 of the cable modem 9 has an Ethernet-header destination address as the MAC address of itself, it extracts this data and supplies it to the IP/TTL filters 36. The IP/TTL filters 36 determine whether or not the source IP address included in the IP header in the data input belongs to an apparatus to be managed, and also determine whether or not the life time of the data on the Internet expires. When both conditions are satisfied, the IP/TTL filters 36 supply the MAC address adder 37 with the data (IP datagram) input by the MAC filter 35.

The MAC address adder 37 adds both the MAC address ff:ff:ff:ff:ff:01 of the head end 21 as an Ethernet-header destination address and its MAC address ab:cd:aa:44:33:11 as the source address to the data (IP datagram) supplied from the IP/TTL filters 36, and it outputs the addition as upstream data from the coaxial cable to the optical fiber cable 6.

The head end 21 of the center 1-1 outputs to the computer 3-1 by the Internet 2 the data transmitted via the optical fiber cable 6. In such a manner, when the computer 3-1 is accessed from the personal computer 12-1, it outputs the data of its home page to the head end 21 of the center 1-1 via the Internet 2. At this time, the source address is set to the IP address 312.0.0.1 of the computer 3-1, and the destination IP address is set to the IP address 192.0.0.1 of the personal computer 12-1. The source address of the Ethernet header is set to the MAC address 55:39:de:71:33:55 of the computer 3-1, and the destination address is set to the MAC address ff:ff:ff:ff:ff:01 of the head end 21.

The head end 21 forms an Ethernet frame from the data supplied from the computer 3-1. After the destination address of the Ethernet header is set to the MAC address ab:cd:aa:44:33:11 of the cable modem 9, and the source address is set to the MAC address ff:ff:ff:ff:ff:01 of the head end 21, they are output to the cable modem 9.

The cable modem 9 changes the Ethernet-header destination address to the MAC address 34:17:af:28:33:11 of the personal computer 12-1 and the source address to the MAC address ab:cd:aa:44:33:11 of itself, and outputs the data to the personal computer 12-1 via the LAN 10.

In addition, for example, when data to be transmitted from the personal computer 12-1 of the terminal 11-1 to the personal computer 12-n of the terminal 11-n is input, the cable modem 9 operates as follows. The destination address of this Ethernet header is set to the MAC address ab:cd:aa:44:33:11 of the cable modem 9, and the source address is set to the MAC address 34:17:af:28:33:11 of the personal computer 12-1. The destination IP address of the IP header is set to the IP address 199.0.0.1 of the personal computer 12-n, and the source IP address is set to the IP address 192.0.0.1 of the personal computer 12-1.

When data is input from the personal computer 12-1 via the LAN 10, the MAC filter 35 of the cable modem 9 determines from the Ethernet header whether or not the data input has a destination address designating itself. In the mentioned case, the data (IP datagram) has a destination address designating itself, and is accordingly output to the IP/TTL filters 36.

The IP/TTL filters 36 check the IP address and TTL in the data input, and when these are correct, they supply the IP datagram to the DHCP/DNS/DNMP units 32. The DHCP/DNS/DNMP units 32 supply the input IP datagram to the MAC address adder 34. After the MAC address adder 34 processes the data (IP datagram) supplied from the DHCP/DNS/DNMP units 32 by setting the destination address of the Ethernet header to the MAC address 34:17:af:28:33:99 of the personal computer 12-n, and the source address to its own MAC address ab:cd:aa:44:33:11, it outputs the data to the LAN 10.

The LAN 10 supplies the data to the terminals 11-1 to 11-n. Among the terminals, the personal computer 12-n of the terminal 11-n is designated by the Ethernet-header destination address and the IP-header destination IP address of the data supplied. Accordingly, its data is acquired and processed.

In addition, when a predetermined command (e.g., a command for requesting a condition response) is input from the head end 21 to the cable modem 9 and it returns the corresponding response (condition), it operates as follows. Specifically, the MAC filter 31 extracts the Ethernet header of the data supplied from the head end 21, and extracts the destination address written therein. When the destination address is the MAC address of the MAC filter 31, the IP/TTL filters 33 determine whether or not the destination IP address designates themselves. If the IP address designates themselves, the data (IP datagram) is supplied to the DHCP/DNS/SNMP units 32.

The DHCP/DNS/SNMP units 32 extract the application data of the IP datagram in the input Ethernet frame. The SNMP unit executes the process corresponding to a command included therein. The SNMP unit generates the response corresponding to the command, and writes it in the application data in the IP datagram. The DHCP/DNS/SNMP units 32 write the IP address 11.0.0.1 of the cable modem 9 as the source IP address of the IP header, and also write the IP address 10.0.0.1 of the head end 21 as the destination IP address. And, the IP datagram is output to the MAC address adder 37.

The MAC address adder 37 sets the Ethernet header so that the MAC address ff:ff:ff:ff:ff:01 of the head end 21 is used as its destination and the MAC address ab:cd:aa:44:33:11 of the cable modem 9 is used as the source address. The MAC address adder 37 outputs this data to the coaxial cable 8.

Figure 9:
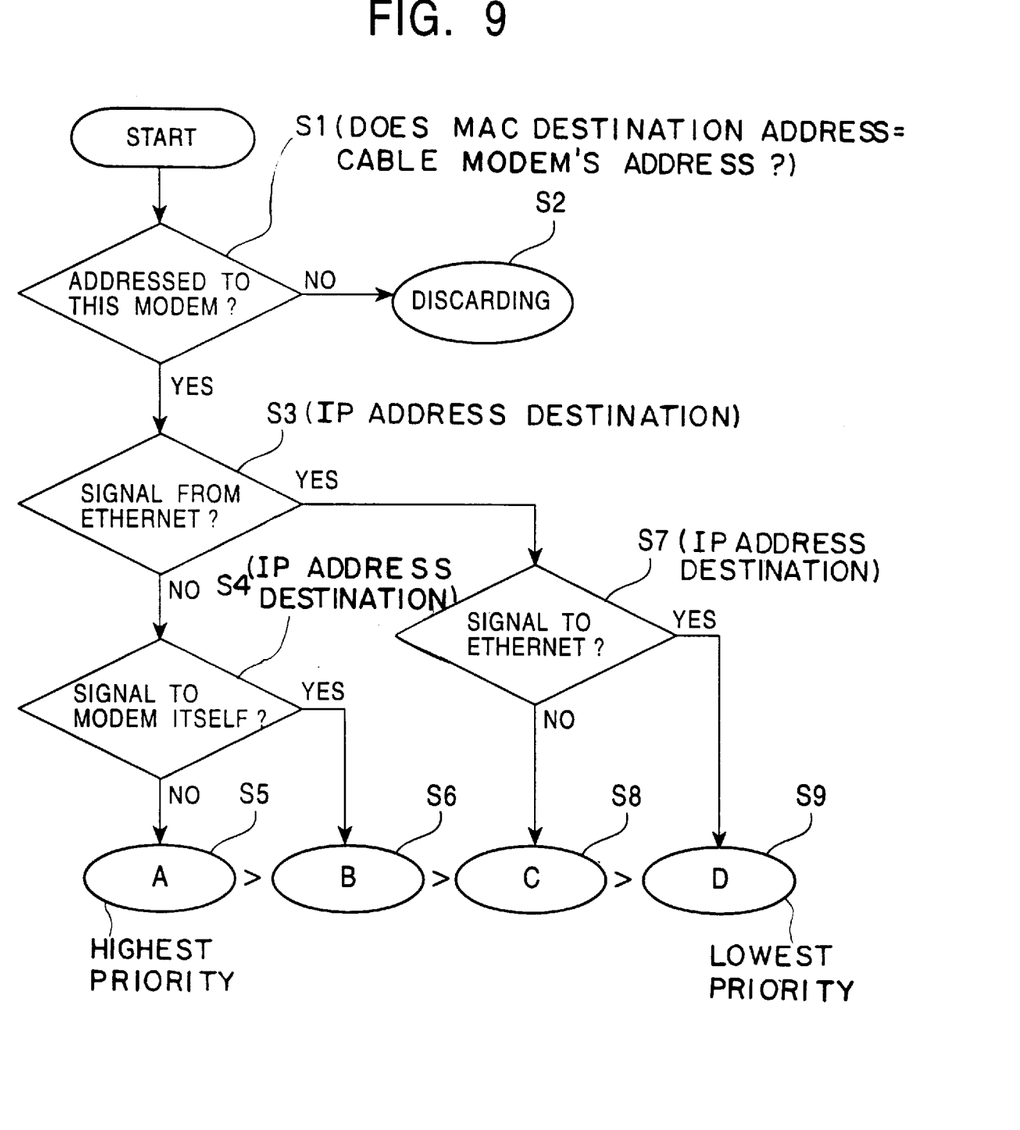
FIG. 9 is a flowchart illustrating a process for providing priority.

As described above, the modem channel processes of the cable modem 9 include the following four processes of: outputting to the LAN 10 data supplied from the coaxial cable 8; outputting to the coaxial cable 8 data corresponding to the data input via the coaxial cable 8; outputting to the coaxial cable 8 data supplied from the LAN 10; and re-outputting to the LAN 10 data supplied from the LAN 10. The DHCP/DNS/SNMP units 32 of the cable modem 9 provide the four processes with priority. FIG. 9 shows a process for providing the priority.

Initially, in step S1, the process determines whether or not the input data is one having a destination address (MAC address) designating the cable modem 9. This determination is performed based on the destination address of the Ethernet header by the MAC filters 31 and 35. If the process has determined that the input data is not one having a destination address designating the cable modem 9, the process proceeds to step S2, in which a discarding is performed. In other words, in this case, the cable modem 9 does not execute a special process.

If, in step S1, the process has determined that the input data is one having a destination address designating the cable modem 9, the process proceeds to step S3, in which determination of whether or not the input data is one from the Ethernet (LAN 10) is performed. This determination is performed based on the source address of the Ethernet header by the MAC filters 31 and 35. Otherwise, it is performed based on the source IP address of the IP header by the IP/TTL filters 33 and 36.

If, in step S3, the process has determined that the input data is not one from the Ethernet (LAN 10), in other words, if the process has determined that the input data is one supplied from the center 1-1 via the coaxial cable 8, the process proceeds to step S4 to determine whether or not the input data is one addressed to the cable modem 9 itself. This determination is performed based on the destination IP address of the IP header by the IP/TTL filters 33 and 36. In step S4, if the process has determined that the input data is not one addressed to the cable modem 9, the process proceeds to step S5, in which the DHCP/DNS/SNMP units 32 set the priority of the input data to A. If, in step S4, the process has determined that the destination IP address of the input data is set so as to designate the cable modem 9, the process proceeds to step S6, in which the DHCP/DNS/SNMP units 32 set the priority of the data to B.

In addition, if, in step S3, the process has determined that the input data is one from the LAN 10, it proceeds to step S7, in which determination of whether or not the data is transmitted to the Ethernet side is performed. This determination is performed such that the destination IP address of the IP header is read by the IP/TTL filters 33 and 36.

If the process has determined that the data input in step S7 is not one for the LAN 10, in other words, it has determined that the data input is one to be transmitted to the coaxial cable 8, it proceeds to step S8, in which the DHCP/DNS/SNMP units 32 set the priority of the data to C. If, in step S7, the process has determined that the data input is one for the LAN 10, it proceeds to step S9, in which the DHCP/DNS/SNMP units 32 set the priority of the data to D.

The priority is in the set order of A, B, C and D. Accordingly, the highest priority one is data which is input via the coaxial cable 8 and is output to the LAN 10. This data is, for example, image data supplied from the computer 3-1 to the personal computer 12-1 via the Internet 2 and the head end 21. Thus, if there is a case where the data has the greatest quantity or the data is moving picture data, lack of the data makes it impossible to display moving pictures. Accordingly, the data must be processed as the highest priority.

Conversely, data having priority B is data addressed to the cable modem 9, and normally, in many cases, it is a command addressed to the cable modem 9. Since the response corresponding to this command can be sent if necessary after the processing of data having priority B terminates, the data having priority B has a lower order compared with the data having priority A.

In addition, data supplied from the LAN 10 is processed with higher priority compared with the data output to the coaxial cable 8, having priority C, and the data sent back to the LAN 10. In many cases, the data output from the cable modem 9 to the coaxial cable 8 is processed by only the cable modem 9. Conversely, when there is another cable modem within the LAN 10, the process of returning data to the LAN 10 can be performed by the cable modem. Accordingly, the data output to the coaxial cable 8 is processed as higher priority, compared with the data returned to the LAN 10.

In this embodiment, the cable modem 9 processes the data supplied from the coaxial cable 8 as higher priority before processing the data supplied from the LAN 10. In other words, the LAN is a network used in a relatively narrow region, while it is concluded that the network connected to the coaxial cable 8 is a network including a wider region as represented by the Internet 2 and is for more urgent use.

Figure 10:
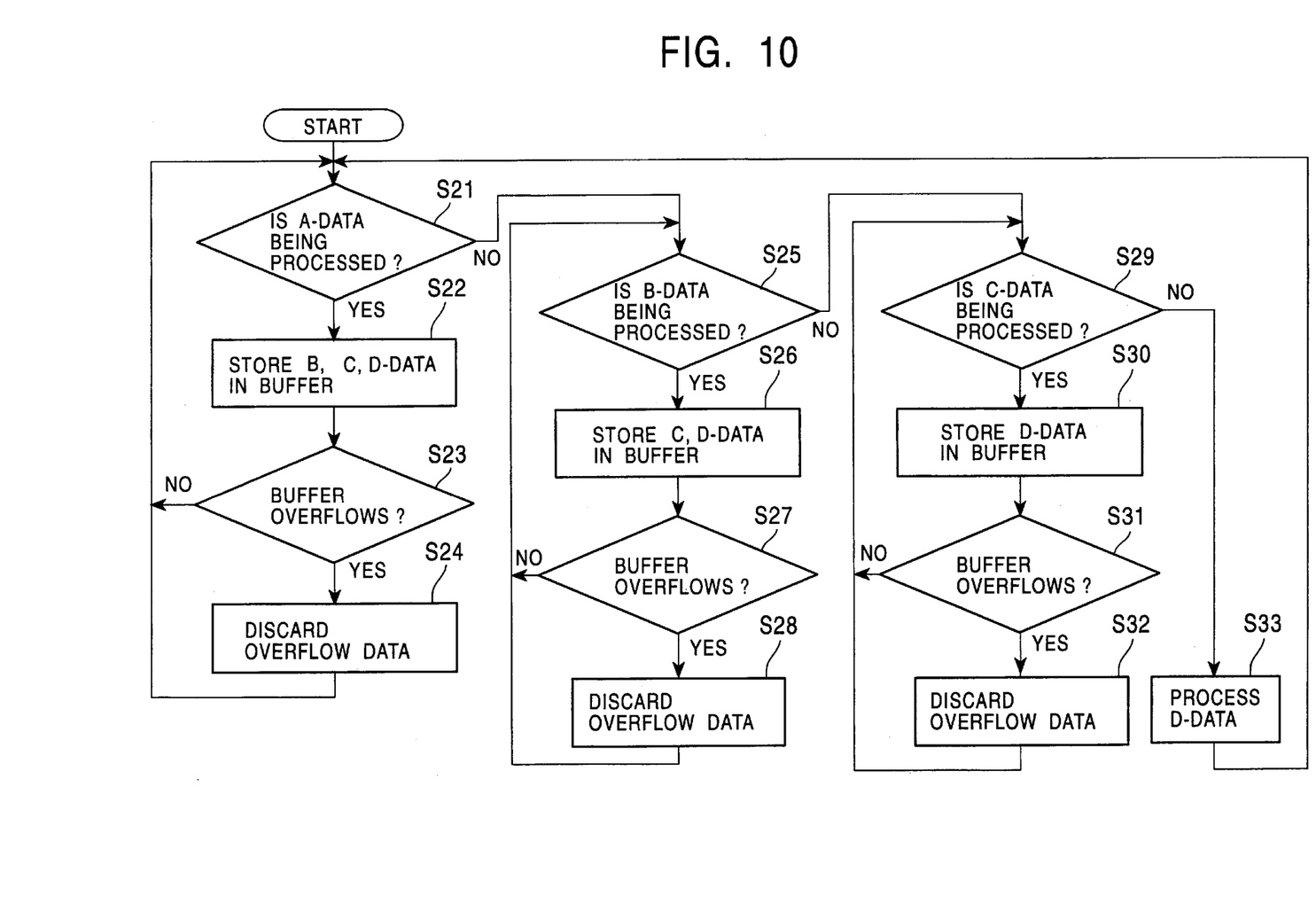
FIG. 10 is a flowchart illustrating the processing of data provided with priority.

FIG. 10 shows a specific process by the DHCP/DNS/SNMP units 32, and the IP/TTL filters 33 and 36 in the case where priority has been set in the above manner.

Specifically, initially, in step S21, the process determines whether or not the data having priority A is being processed. If the data having priority A is being processed, the process proceeds to step S22, in which the data having priority B, C or D (lower priority data) is stored in buffer memory 32A, 33A or 36A. The process proceeds subsequently to step S23, in which the process determines whether or not the memory 32A, 33A or 36A overflows. If it has determined that no overflow occurs, it returns to step S21, in which the subsequent steps are repeatedly executed. Conversely, if the process has determined in step S23 that the memory 32A, 33A or 36A overflows, it proceeds to step S24, and the process of discarding overflow data is executed. And, the process returns to step S21.

In this manner, the priority A process is executed, even if lower priority data is wasted.

If the process has determined in step S21 that the data having priority A is not being processed, it proceeds to step S25, in which it determines whether or not the data having priority B is being processed. If the process has determined that the data having priority B is being processed, it proceeds to step S26, in which the step of storing in the memories 32A, 33A and 36A the data having lower priority C and D is executed. In step S27, the process determines whether or not the memory 32A, 33A or 36A overflows. If the process has determined that no overflow occurs, it returns to step S25, and the subsequent steps are repeatedly executed. If the process has determined in step S27 that the memory 32A, 33A or 36A overflows with the data having priority C or D, it proceeds to step S28, and the step of discarding the overflow data is executed. Thereafter, the process returns to step S25, and the subsequent steps are repeatedly executed.

In short, in this manner, the data having priority B is executed as higher priority, even if the data having lower priority C and D are wasted.

If the process has determined in step S25 that the data having priority B is not being processed, it proceeds to step S29 so as to determine whether or not the data having priority C is being processed. If the process has determined that the data having priority C is being processed, it proceeds to step S30, in which the step of writing the data having lower priority D in the memories 32A, 33A and 36A is performed. Subsequently, the process determines whether or not the memory 32A, 33A or 36A overflows with the data having priority D. If it has determined in step S31 that no overflow occurs, it returns to step S29, and the subsequent steps are repeatedly executed. If the process has determined in step S31 that the data having priority D overflows, it proceeds to step S32, and the step of discarding the overflow data is executed. Thereafter, the process returns to step S29, and the subsequent steps are repeatedly executed.

In this manner, the data having priority C is executed as higher priority, even if the data having lower priority D is wasted.

In addition, if the process has determined in step S29 that the data having priority C is not being processed, it proceeds to step S33, in which the step of processing the data having lowest priority D is executed.

Although the Ethernet is used as the LAN 10 in the foregoing embodiment, another format may be used.

The present invention may be variously modified and applied within the scope thereof. Accordingly, the scope of the present invention is not limited to the foregoing embodiment.

What is claimed is:

1. A control method for an information-supply control apparatus for controlling a supply of information supplied from a first apparatus and from a plurality of second apparatuses, wherein said information-supply control apparatus is connected to the first apparatus via a cable and to the plurality of second apparatuses via a network, said control method comprising:

a first determination step for determining whether received information is first information supplied from the first apparatus or second information supplied from the plurality of second apparatuses including checking a media access control address to detect a destination address of the received information for determining that the received information is the second information when the destination address is the address of the information-supply control apparatus;

a priority providing step for providing the first information with a priority over the second information by checking respective source addresses and destination addresses of the first information and the second information, respectively;

a first processing step for processing the first information and the second information in accordance with the priority provided;

a second determination step for determining whether the received information has overflowed memory; and a second processing step for discarding overflow data.

2. The control method as set forth in claim 1, wherein the first apparatus is a broadcasting apparatus and is connected to said information-supply control apparatus via an optical fiber cable as said cable.

3. The control method as set forth in claim 1, wherein the first determination step determines whether the second information is one of third information to be supplied to the first apparatus and fourth information to be supplied to the plurality of second apparatuses, and the priority providing step provides the third information with a priority over the fourth information.

4. The control method as set forth in claim 1, wherein the first determination step further determines whether the first information is one of third information to be supplied to the plurality of second apparatuses and fourth information to be processed by the information-supply control apparatus, and the priority providing step provides the third information with a priority over the fourth information.

* * * * *